United States Patent [19]
Gechele et al.

[11] 3,770,941
[45] Nov. 6, 1973

[54] DATA PROCESSING SYSTEM FOR HANDLING THE FLOW OF MERCHANDISE ARTICLES OR SERVICES ON A PLURALITY OF SELLING POINTS

[75] Inventors: Walter Gechele, Cascinette; Arnaldo Pasini, Ivrea, both of Italy

[73] Assignee: Ing. C Olivetti & C.,S.p.A., Ivrea (Turin), Italy

[22] Filed: Nov. 18, 1971

[21] Appl. No.: 200,090

[52] U.S. Cl. ... 235/61.7 R, 235/61.9 R, 340/149 R, 340/172.5
[51] Int. Cl. ...... G06k 15/00, H04q 3/00, G06f 3/00
[58] Field of Search .................. 235/61.7 R, 61.7 B, 235/61.6 R, 61.9 R; 340/172.5, 149

[56] References Cited
UNITED STATES PATENTS

| | | | |
|---|---|---|---|
| 3,121,159 | 2/1964 | Rogal | 235/61.9 R |
| 3,335,407 | 8/1967 | Lange et al. | 235/61.6 R |
| 3,622,995 | 11/1971 | Dilks et al. | 235/619 R |

Primary Examiner—Daryl W. Cook
Attorney—Kevin McMahon

[57] ABSTRACT

A data processing system for handling the flow of merchandise articles or services on a plurality of selling points comprises in each selling point a terminal unit for reading data identifying the article or service sold on a ticket associated therewith and for transmitting said data to a central computer. An additional terminal unit is adapted to transmit the number of articles or services available to the computer which in turn causes a recording unit to record accordingly a predetermined number of tickets for each article or service to be transferred to the sellng points. Each terminal unit comprises also an add-subtract unit for effecting transaction computation in local and a printing unit for printing documents.

3 Claims, 6 Drawing Figures

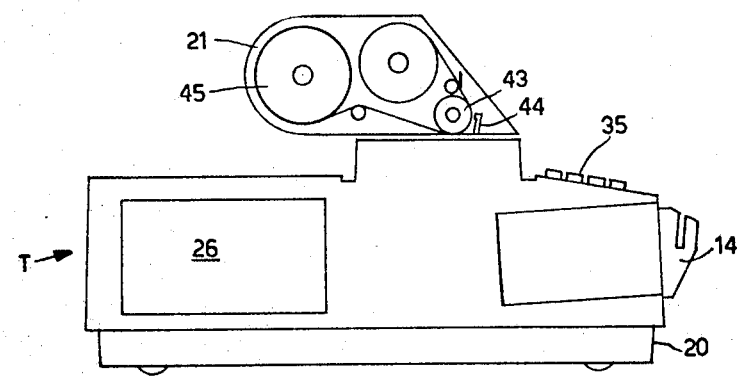
Fig. 4
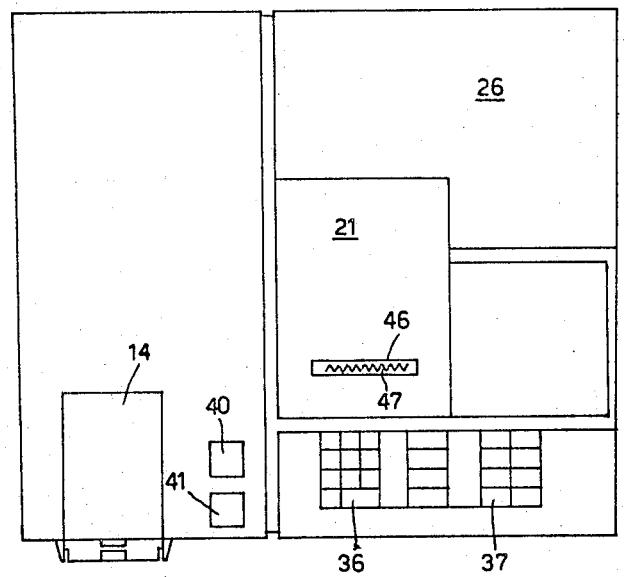
Fig. 5
Fig. 6
| | | | | | | |
|---|---|---|---|---|---|---|
| 1 | 2 | 3 | SALE | CASH | TICKET | |
| 4 | 5 | 6 | | CREDIT CARD | | |
| 7 | 8 | 9 | HOW PAY | | | |
| * | 0 | | TOTAL | TOTAL TAKE | SUB TOTAL | |
INVENTORS
WALTER GECHELE
ARNALDO PASINI
BY
ATTORNEY

DATA PROCESSING SYSTEM FOR HANDLING THE FLOW OF MERCHANDISE ARTICLES OR SERVICES ON A PLURALITY OF SELLING POINTS

CROSS REFERENCE TO RELATED APPLICATION

U. S. Pat. application Ser. No. 199,968 filed on Nov. 18, 1971 and assigned to the assignee of the present application.

BACKGROUND OF THE INVENTION

This intention relates to a data processing system for handling the flow of merchandise articles or services on a plurality of selling points, comprising a central computer, a plurality of data transmission terminal units located at selling points and normally operatively connected to said computer, and a ticket associated with each article or service and recording data for identifying said article or service, said tickets being readable by one of said terminal units before selling said articles or services for transmitting said data to said computer.

Large commercial organizations, such as warehouses, or chains of stores, need to quickly and automatically handle the flow of merchandise from the stock to the selling points, supply them in time to the selling points, thus overcoming the difficulties owing to the geographic position of the selling points. Similar needs are found in commercial organizations supplying services such as chains of hotels, car hiring companies and transportation companies in general.

In order to comply with such needs, electronic data processing systems have been designed, which substantially comprise a central computer processing the data sent by the terminal located at the corresponding selling points. These terminal are adapted to transmit the data concerning the sold mechandises and the type of transaction executed. These data are normally set in each terminal by means of a keyboard, a punched ticket reader, a magnetic ticket reader, a credit card reader or another input device.

These known electronic data processing systems have the disadvantage that tickets associated to the merchandises to be transferred to the selling points must be recorded by a separate manually operated equipment.

SUMMARY OF THE INVENTION

This disadvantage is obviated by the data processing system for handling the flow of merchandise articles or services on a plurality of selling points according to the invention, wherein the improvement comprises: a recording unit conditionable for recording said data on tickets to be associated with articles or services to be transferred to said selling points, and at least an additional data transmitting terminal unit connected to said computer and operable for transmitting the number of articles or services available in stock, said computer being jointly controlled by said additional terminal unit and by said plurality of terminal units for conditioning said recording unit for recording a predetermined number of tickets for each one of said articles and services, in accordance with the number of articles or services in stock and those already sold.

BRIEF DESCRIPTION OF THE DRAWING

A preferred embodiment of the data processing system according to the invention is disclosed by the following description made, by way of example and not in a limiting sense, with reference to the accompanying drawing:

FIG. 3 is a magnetic ticket used by the system for handling merchandises and services according to invention;

FIG. 4 is a front view of the terminal of FIG. 2;

FIG. 5 is a plan view of the terminal of FIG. 2;

FIG. 6 is a keyboard diagram of the terminal of FIG. 4.

DESCRIPTION OF THE PREFERRED EMBODIMENT

The data processing system comprises a central computer 1 (FIG. 1) and a plurality of data sets $4_1, 4_2 \ldots 4_n$ adapted to effect predetermined data processes and connected to the computer 1 by means of transmission lines $2_1, 2_2 \ldots 2_n$, respectively. The central computer 1, comprises an operative memory 100, a computing unit 101, and a control unit 102. This latter is adapted to control the data flow in the central computer 1 and the message interchange between the computer 1 and the data sets $4_1 \ldots 4_n$. The computing unit 101 is adapted to process the data coming from the data sets $4_1 - 4_n$, whereas the operative memory 100 is adapted to store the results of such process. Each data set $4_1 \ldots 4_n$ is connected by means of five connection lines to five multiplexers $7_1, 7_2, 7_3, 7_4, 7_5$, each one provided with a scanner, not shown, adapted to scan a group of 32 data transmitting terminal units $T_1 \ldots T_{160}$, connected thereto and each one located at a corresponding selling point of the organization. Each data set $4_1 \ldots 4_n$ is therefore connected to 160 terminals. Each multiplexer $7_1 - 7_5$ is adapted to connect the terminal unit selected to the corresponding data set $4_1 \ldots 4_n$ in response to their scanning.

Figure 1:
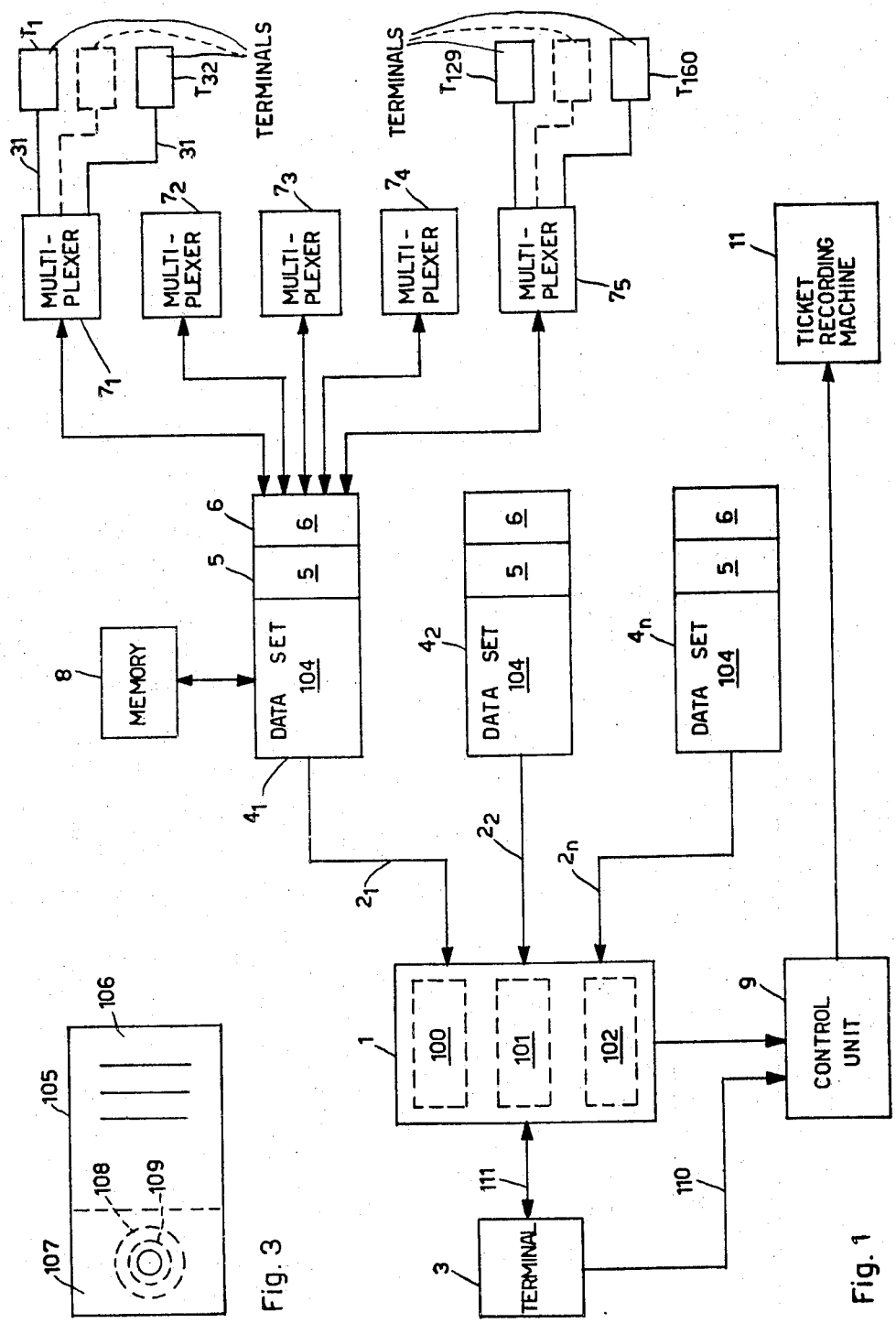
FIG. 1 is a block diagram of a data processing system according to the invention.

Each data set $4_1 \ldots 4_n$ comprises a computing unit 6 adapted to process the data coming from the terminals $T_1 \ldots T_{32}$, and a scanning unit 5 adapted to scan the multiplexers $7_1 \ldots 7_5$ for selecting the multiplexers and therefore the terminal $T_1 \ldots T_{32}$ already selected thereby for connecting the so selected terminal to the computing unit 6. Each data set $4_1 \ldots 4_n$ also comprises an internal memory 104 adapted to memorize the data coming from the terminals $T_1 \ldots T_{160}$ and programs of operation of the same data set. Each data set $4_1 \ldots 4_n$ finally comprises an external memory 8 of which only one is shown in FIG. 1. Each memory 8 is formed of a magnetic tape unit for recording the results of the operations effected by and the data coming from, the terminals $T_1 \ldots T_{160}$ connected thereto.

Furthermore, the central computer 1 is connected to a ticket recording machine 11, of the type described in copending U. S. Pat. application Ser. No. 199,968 filed on Nov. 18, 1971 and assigned to the assignee of the present application. The ticket machine 11 is adapted to print on tickets 105 (FIG. 3) data in visually readable form and/or to record same in machine readable form. Particularly, each ticket 105 comprises an area 106 where the price, the size, the color and the other information referred to a specific merchandise article are printed in a visually readable form and an area 107 where the same data are magnetically recorded on two circular tracks 108 and 109 of a magnetizable layer.

The machine 11 (FIG.1) is controlled by an electronic control unit 9 to print and magnetically record on the ticket 105 these data in a manner described in the above cited U. S. Patent Application Ser. No. 199,968. Furthermore, the machine 11 is directly connected by a transmission line 110 to an additional terminal unit 3, preferably located in warehouse where the merchandises are stored. The terminal Unit 3 may be of any type commonly marketed, for instance the type described in U. S. Pat. No. 3,611,303 which is assigned to the assignee of the present case. The computer 1 is connected to the terminal unit 3 by means of a transmission line 111, and is adapted to receive information therefrom on the merchandises available in the warehouse and to transmit thereto the information on the merchandises to be purchased. The last information is originated in response to the processing operations effected by the central computer 1.

Figure 2:
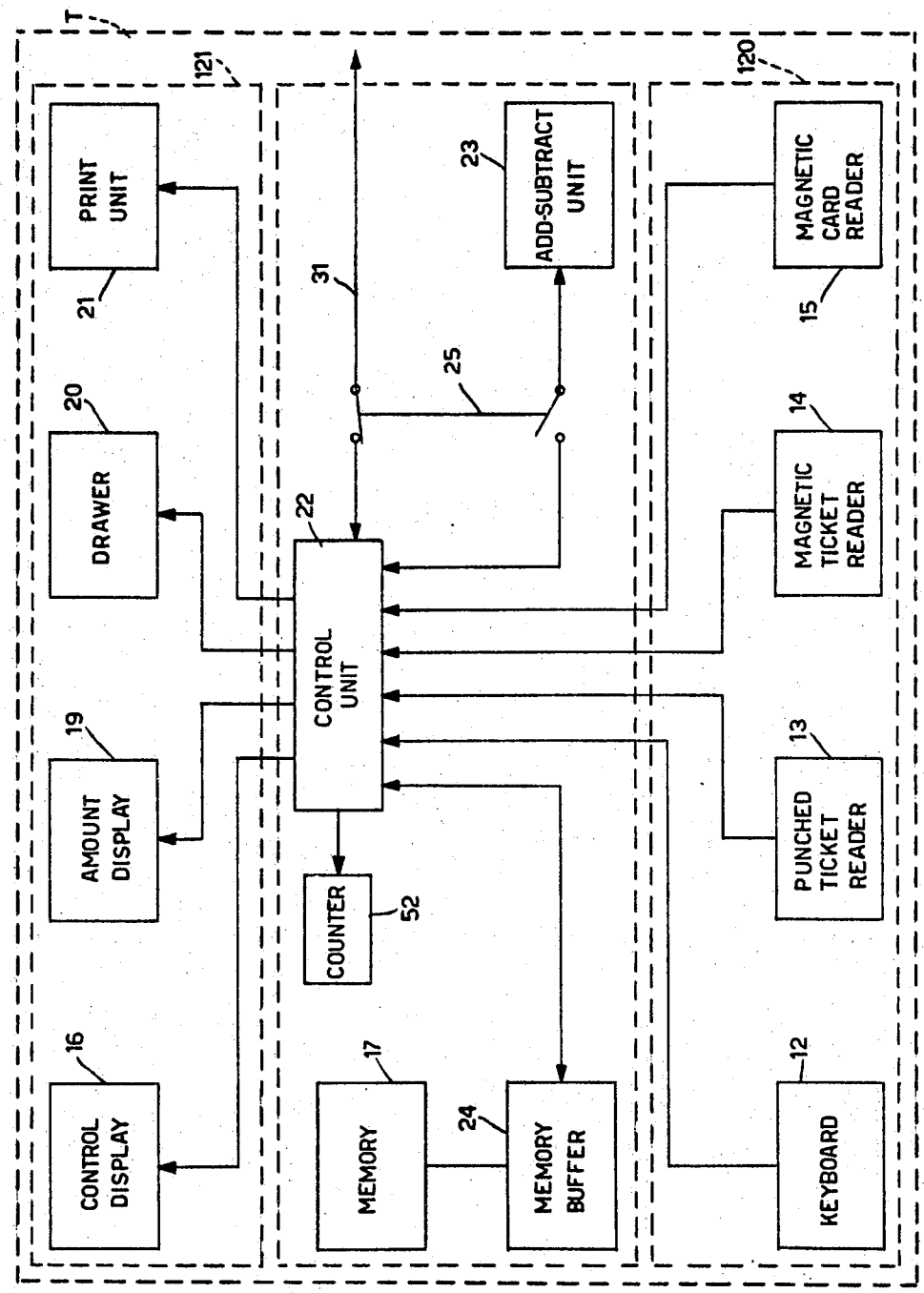
FIG. 2 is a block diagram of a terminal of the system of FIG. 1.

Each terminal unit $T_1 \ldots T_{160}$, now generically indicated by the letter T (FIG.2), comprises a set of peripheral input units generically indicated by the numeral 120 and including a keyboard 12, a punched ticket reader 13, a magnetic ticket reader 14, and a credit card reader 15, so that the input unit 12–15 according to the kind of ticket can be used each time. Each terminal T also comprises sets of output peripheral units generically indicated by the numeral 121, including a pair of displays 16 and 19 controlled by the control units 26. The display 16 is used during the interconnection between terminal T and the data set 4 (FIG. 1) for displaying instructions or control signals to the operator so as to enable him to set up the next controls or data. Examples of such instructions are: MERCHANDISE CODE, PRICE, NEW PRICE, HOW PAY, TICKET.

The display 19 is provided to display amounts set up on the keyboard 12 both to the operator and the customer; its capacity is of seven digits including the decimal point. In addition it displays a symbol representing the kind of the displayed amount. The peripheral units 121 comprise also a print unit 21 adapted to print out the data concerning the transaction, and a drawer 20 having means operable for automatically opening and closing same. The peripheral units 120 are adapted to send the data relative to the merchandise, as well as the relevant controls, to an electronic control unit 22 in turn capable of controlling the operation of the input units 120 in a manner known per se.

Furthermore, the electronic control unit 22 is adapted to control the peripheral units 121 and an adding and subtracting or arithmetic unit 23 capable of executing additions and subtractions. The control unit 22 is connected to a memory buffer 24, adapted to temporarily memorize data. Connected to the buffer 24 is a memory 17 adapted to memorize the data to be sent to the peripheral units 121. The arithmetic unit 23, the buffer 24 and the data memory 17 may be of any known type and therefore they will not be described in details. The operation of the control unit 22 depends only upon the controls supplied by the data set 4 (FIG. 1), connecting the terminal T through the transmission line 31.

The keyboard 12 (FIGS. 5 and 6) comprises a 10 key numeric keyboard 36 and a function keyboard 37 comprising 12 function keys. The keys 36 are used for entering into the control unit 22, the numeric data on the transaction, while the function keys 37 are used to set controls for conditioning the control unit 22 to effect the transaction. The circuits which are conditioned by the function keys may be readily identified by people skilled in the art based upon the performances which will be disclosed hereinafter, therefore such circuits will not be described in detail. The punched ticket reader 13 (FIG. 2), the magnetic ticket reader 14 and the credit card reader 15, operate in a manner known per se and will not be described in detail. Also the circuits of the control unit 22 (FIG. 1) adapted to condition the displays 16 and 19, the printer 21 and the drawer 20 may be readily defined by people skilled in the art based upon the control signals coming from the control unit 22, the concentrator 4 and the keys 36 and are also omitted here.

The printing unit 21 (FIG. 4) comprises a type carrying drum 49 rotatable about an horizontal shaft, and provided with a plurality of alpha-numeric characters arranged in columns and rows. A hammer 44 movable transversely is selectively operated for printing one character on each column of the drum 43. The alphabetical characters are so arranged on the drum 43 as to allow the printing of the predetermined words showing the significance of the printed amounts despite the fact that each column of characters comprises only 16 characters. For example prior to a total taken for the transaction the word TOTAL may be printed out.

The tickets are provided by a paper roll 45, which comes out from a slit 46. A knife 47 is provided for cutting the paper strip to supply a cash receipt. A further document such as a card may be front fed in the slit 46 so that the data of the transaction may be also printed thereon as well as on the conventional journal made of another paper strip of the roll 45. Finally, at the end of each operation the control unit 22 controls in a known manner the means for opening and closing the drawer 20, which is located on the lower part of the terminal T.

The terminal unit T may be also used for effecting additions and subtractions in local or off-line. To this end, it is provided with a hand operable switch 25 (FIG. 2), which, when operated connects the arithmetic unit 23 to the control unit 22 and disconnects the control unit 22 from the multiplexer 7.

The data processing system operates as follows. Each article on sale in each selling point is provided with a ticket which may be of the magnetic type, as the ticket 105 of FIG. 3, or of the punched type. It is furthermore possible that some articles have a magnetic ticket and some other a punched one, for instance in the event that some articles have tickets prepared by equipment other than the ticket recording machine 11 (FIG. 1). Other articles may be finally provided with a ticket, lacking the coded portion. In such a case the operator must manually set up the relevant data on the keyboard 12. Furthermore, each operator is provided with a badge comprising a magnetic area similar to the area 107 of ticket 105 and where the identification data of the operator are recorded.

To start a transaction, the operator switches on the corresponding terminal unit T, for example the terminal $T_1$, by depressing the key "SALE" (FIG. 6) of keyboard 37. In response to this depression, a message interchange between the terminal $T_1$ and the data set $4_1$, is established by the multiplexer $7_1$, while the control unit 22 of the terminal $T_1$, through the display unit 16 (FIG. 2) asks the operator for the initial transaction data.

The operator inserts at first his badge into the magnetic reader 14, which reads the identification code and transmits it to the data set $4_1$ through the control unit 22.

According to the kind of ticket associated with the article sold the operator uses now, for entering the merchandise data into the terminal unit $T_1$, either the magnetic ticket reader 14, the punched ticket reader 13 or the numeric keyboard 36. The data so entered include the price of the article, which is added by the computing unit 6 of (FIG. 1) the data set $4_1$ to the previous transaction effected by the same terminal $T_1$ and memorized it on the tape memory 8. The data set $4_1$ sends now to the control unit 22 (FIG. 2) control signals which operate in known manner the display 19 and the printer 21. The price is thus printed on the cash receipt and displayed on the display 19.

If the transaction consists of the sale of a plurality of articles, the described operations are repeated for each article. The amount relating to individual articles can be printed by depressing a SUB-TOTAL key (FIG. 6). This causes the printer 21 to print the total on the journal 49, on the receipt, and/or on a card previously inserted by the operator into the slit 46 of the terminal unit $T_1$. The operator may operate now the terminal unit $T_1$ to calculate sale taxes or discounts.

The result of calculation is then transmitted to the control unit 22 in conjunction with the control signals whereby the total amount to be paid is printed on the cash receipt and displayed on display 19.

The operator depresses now the TOTAL key (FIG. 6), which causes the control unit 22 to send a signal to the data set $4_1$. This latter in turn sends a signal to the control unit 22 which causes the inscription "NOW PAY" to appear on the display 16. If the payment is made by cash, the operator depresses the key CASH, which cause the data set $4_1$ to control the printing unit 21 to print the paid total amount. Concurrently the computing unit 6 of the data set $4_1$, adds said total to the total of the previous transactions, and memorizes the new total on the tape memory 8.

If the payment is made by means of a credit card, the operator inserts the credit card into the credit card reader 15 and depresses the key CREDIT CARD. The data set $4_1$, controls now the printing unit 21 to print the paid amount, and the credit card reader 15 (FIG.2) to read the credit card, whereby the credit card number is transmitted to the data set $4_1$. This latter by means of the computing unit 6, provides to subtract the amount to be paid from the credit stored in the memory 8 and identified by the number recorded on the credit card.

At the end of each transaction the data set 41 causes the drawer to be open, and the display 16 to display the inscription TICKET, indicating to the operator the receipt is to be detached.

At the end of the working day, the operator depresses the key TOTAL TAKE, which causes the data set $4_1$ to print the total of the transaction effected along the day.

If an interruption occurs on the line connecting the terminal $T_1$ to the data set $4_1$ or in the case the system works in a batch mode whereby the operator periodically sends the data of the transactions to the computer, the operator switches the switch 25 (FIG. 2), which disconnects the control unit 22 from the data set $4_1$, and connects the computing unit 23 to the control unit 22. Therefore, the terminal unit $T_1$ can be used for effecting off-line additions and subtractions. For entering the data in the terminal $T_1$ the operator operates the numeric keyboard 12 or inserts the magnetic ticket 16 into the reader 15 as in the preceding case This latter supplies to the memory buffer 24 only the price of the merchandise, which is recorded immediately after a character identifying the start of the track 108 (FIG. 3) of the ticket 105 as a fixed number of characters. A counter 52 controlled by the control unit 22 now counts the characters read by the reader 14 and generates a signal each time it recognizes such fixed number. This signal disables in a known manner the reader 14 and prevents the data subsequently recorded from being entered into the memory buffer 24.

The numerical values posted on the numeric keyboard 36 are also memorized in the memory buffer 24 (FIG. 3), and from here they are sent to the arithmetic unit 27 for effecting the requisite computations. The result of the computations is then memorized in the memory 17.

When the terminal $T_1$ is again connected to the data set $4_1$, the memorized result is transferred to the memory 8 of the data set $4_1$. These data are also transmitted on-line to the central computer 1.

The computer 1 is also adapted to count, in a known manner, the number of units sold for each article and to compare this number with a prefixed number associated with the same article and recorded in a portion of the memory 100 of the computer 1. When the sold units excede such fixed number it is required to supply the selling point. The central computer 1 then conditions the control unit 9 to control the ticket recording machine 11 to record new tickets 106 for the required article. Therefore the computer 1 gives for each article the data relating to the price and the code of the article as well as the data relating to the number of tickets to be printed, the last number being determined taking into account the number of units of the article present in the warehouse. To this end the terminal 3 located at the warehouse transmits to the computer 1 each modification of the number of units of article stored in the warehouse.

If the number given by the terminal 3 is less than the number of the sold units stored in the computer 1, this latter through the control unit 9 causes the machine 11 to record only a number of tickets equal to the quantity of the articles stored in the warehouse.

The so produced tickets are now attached to the merchandise articles to be sent to the selling points.

In addition, since the central computer 1 receives from the terminal 3 the data concerning the quantity and the type of the merchandise in the warehouse, it compares these data with the data on the minimal supplies required and recorded in the memory 100. The computer 1 thus computes the quantity of merchandise to be purchased, and sends to the terminal 3 through the line 111 the purchasing orders for the merchandise required to restock the warehouse.

It is thus clear that the recording unit 11 is conditionable for recording data identifying the articles on tickets to be associated with the articles, that the additional terminal 3 is provided for transmitting to the computer 1 the number of articles available in the stock and that the computer 1 is jointly controlled by the terminal 3 and the terminals $T_1 \ldots T_{160}$ for conditioning the ticket recording unit 11 for recording a predetermined number of tickets 105 in accordance with the number of the articles or services in stock and of those already sold.

It is intended that many changes, substitutions or additions of parts may be made to the described processing system without departing from the scope of the invention. For example the number of the data sets or the terminal units may be changed by taking into account the user needs. Furthermore, each terminal may have different input units or the function keys so as to adapt the terminal to the types of transaction to be executed.

We claim:

1. A data processing system for handling the flow of merchandise articles or services on a plurality of selling points comprising a central computer, a plurality of data transmission terminal units located at selling points and normally operatively connected to said computer, and a ticket associated with each article or service and recording data for identifying said article or service, said tickets being readable by one of said terminal units before selling said articles or services for transmitting said data to said computer wherein the improvement comprises:

a recording unit conditionable for recording said data on tickets to be associated with articles or services to be transferred to said selling points, and at least an additional data transmitting terminal unit connected to said computer and operable for transmitting the number of articles or services available in stock, said computer being jointly controlled by said additional terminal unit and with said plurality of terminal units for conditioning said recording unit for recording a predetermined number of tickets for each one of said articles and services, in accordance with the number of articles or services in stock and those already sold.

2. A system according to claim 1, wherein each terminal unit of said plurality comprises at least an input device for reading the information recorded on said tickets, said recording unit recording said information in form readable by each one of said input unit.

3. A system according to claim 1, wherein each terminal unit of said plurality comprises a control unit for normally connecting the relevant terminal to said central computer, an adding and subtracting unit conditionable for effecting transaction computations and manually operable switching means for connecting said adding and subtracting unit to said control unit and for disconnecting the latter from said central computer, whereby the relevant terminal unit is caused to effect by itself transation computations and to send the results to said computer.

* * * * *